US010664488B2

(12) United States Patent
Venkata et al.

(10) Patent No.: US 10,664,488 B2
(45) Date of Patent: May 26, 2020

(54) SEMANTIC SEARCHES IN A BUSINESS INTELLIGENCE SYSTEM

(71) Applicant: ORACLE INTERNATIONAL CORPORATION, Redwood Shores, CA (US)

(72) Inventors: Ananth Venkata, Pleasanton, CA (US); Jacques Vigeant, Fort Lauderdale, FL (US); Satish Gopalakrishna, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 109 days.

(21) Appl. No.: 14/861,893

(22) Filed: Sep. 22, 2015

(65) Prior Publication Data

US 2016/0092572 A1 Mar. 31, 2016

Related U.S. Application Data

(60) Provisional application No. 62/055,402, filed on Sep. 25, 2014.

(51) Int. Cl.
*G06F 16/248* (2019.01)
*G06F 16/2453* (2019.01)

(52) U.S. Cl.
CPC ...... *G06F 16/248* (2019.01); *G06F 16/24534* (2019.01)

(58) Field of Classification Search
CPC ......... G06F 17/30448; G06F 17/30554; G06F 16/24534; G06F 16/248; H04L 67/22; H04L 67/327
See application file for complete search history.

(56) References Cited

U.S. PATENT DOCUMENTS 5,418,948 A 5/1995 Turtle
7,047,242 B1 5/2006 Ponte
(Continued)

FOREIGN PATENT DOCUMENTS

AU 2005311621 6/2006
WO 2018204696 11/2018

OTHER PUBLICATIONS

Data sources for Power BI service, Microsoft Power BI, https://powerbi.microsoft.com/en-us/documentation/powerbi-service-get-data/, 2015, 7 pages, retrieved on Mar. 10, 2016.
(Continued)

*Primary Examiner* — Shew Fen Lin
(74) *Attorney, Agent, or Firm* — Kilpatrick Townsend & Stockton LLP (57) ABSTRACT

A computer-implemented method of executing a user query includes presenting a user interface to allow a user to enter a query, receiving a user-entered textual request through the interface, launching a search service to rewrite the textual request into a search query, sending the search query to a presentation server, receiving an answer to the query, and returning the answer to the user as a graphical representation. A computer-implemented method includes receiving a crawl request from a user, launching a crawl manager to monitor the crawl request and track statistics related to the crawl, starting a crawl task based upon the crawl request, indexing a business intelligence presentation server to create a data index, and storing the data index.

18 Claims, 10 Drawing Sheets

(56) References Cited

U.S. PATENT DOCUMENTS

| | | |
|---|---|---|
| 7,802,195 B2 | 9/2010 | Saul et al. |
| 8,533,619 B2 | 9/2013 | Baier et al. |
| 8,788,514 B1 | 7/2014 | Ramanarayanan et al. |
| 8,860,727 B2 | 10/2014 | Beers et al. |
| 8,954,446 B2 | 2/2015 | Vijayan Retnamma et al. |
| 8,966,386 B2 | 2/2015 | Fok et al. |
| 9,092,802 B1 | 7/2015 | Akella |
| 9,098,183 B2 | 8/2015 | Vonshak et al. |
| 9,292,628 B2 | 3/2016 | Beers et al. |
| 9,338,652 B1 | 5/2016 | Allen et al. |
| 9,424,318 B2 | 8/2016 | Anand et al. |
| 9,501,585 B1* | 11/2016 | Gautam ............ G06F 17/30572 |
| 9,582,913 B1 | 2/2017 | Kraft et al. |
| 9,600,528 B2 | 3/2017 | Mackinlay et al. |
| 9,613,102 B2 | 4/2017 | Anand et al. |
| 9,665,641 B1 | 5/2017 | Zhang |
| 9,858,292 B1 | 1/2018 | Setlur et al. |
| 9,870,629 B2 | 1/2018 | Cardno et al. |
| 10,048,854 B2 | 8/2018 | Zhang et al. |
| 10,417,247 B2 | 9/2019 | Venkata et al. |
| 2005/0060286 A1* | 3/2005 | Hansen ............ G06F 17/30864 |
| 2005/0076085 A1 | 4/2005 | Budd et al. |
| 2007/0279484 A1 | 12/2007 | Derocher et al. |
| 2008/0118916 A1 | 5/2008 | Sood et al. |
| 2008/0233980 A1 | 9/2008 | Englund et al. |
| 2009/0327263 A1 | 12/2009 | Maghoul |
| 2010/0057679 A1* | 3/2010 | King ..................... G06F 16/242 |
| | | 707/E17.014 |
| 2010/0070448 A1† | 3/2010 | Omoigui |
| 2011/0055241 A1† | 3/2011 | Lewis |
| 2011/0081948 A1 | 4/2011 | Shirai et al. |
| 2011/0123115 A1 | 5/2011 | Lee et al. |
| 2011/0249900 A1 | 10/2011 | Thoern et al. |
| 2012/0066602 A1 | 3/2012 | Chai et al. |
| 2012/0084689 A1 | 4/2012 | Ledet et al. |
| 2012/0088543 A1 | 4/2012 | Lindner et al. |
| 2012/0110565 A1 | 5/2012 | O'Sullivan et al. |
| 2012/0134590 A1 | 5/2012 | Petrou et al. |
| 2012/0259833 A1* | 10/2012 | Paduroiu ........... G06F 17/30864 |
| | | 707/709 |
| 2012/0289290 A1 | 11/2012 | Chae et al. |
| 2012/0311074 A1 | 12/2012 | Arini et al. |
| 2012/0323910 A1* | 12/2012 | Ilyas ................. G06F 17/30867 |
| | | 707/732 |
| 2013/0006904 A1* | 1/2013 | Horvitz .................. G06Q 10/10 |
| | | 706/46 |
| 2013/0042259 A1 | 2/2013 | Urbach |
| 2013/0113943 A1 | 5/2013 | Wormald et al. |
| 2013/0117319 A1 | 5/2013 | Soltani et al. |
| 2014/0033079 A1* | 1/2014 | Sage ...................... G06F 16/26 |
| | | 715/760 |
| 2014/0046934 A1* | 2/2014 | Zhou ................. G06F 16/24578 |
| | | 707/723 |
| 2014/0040977 A1 | 4/2014 | Barton et al. |
| 2014/0108793 A1 | 4/2014 | Barton et al. |
| 2014/0172408 A1 | 6/2014 | Vukosavljevic et al. |
| 2015/0012830 A1 | 1/2015 | Choi et al. |
| 2015/0012854 A1 | 1/2015 | Choi et al. |
| 2015/0026145 A1* | 1/2015 | Prakash ................ G06F 16/243 |
| | | 707/706 |
| 2015/0026153 A1 | 1/2015 | Gupta et al. |
| 2015/0138228 A1 | 5/2015 | Lum et al. |
| 2015/0227632 A1 | 8/2015 | Lunardi et al. |
| 2015/0242086 A1 | 8/2015 | Mindlin |
| 2015/0347920 A1† | 12/2015 | Medlock et al. |
| 2015/0356068 A1 | 12/2015 | Hill et al. |
| 2015/0365426 A1 | 12/2015 | Henocque |
| 2016/0055374 A1 | 2/2016 | Zhang et al. |
| 2016/0085602 A1 | 3/2016 | Jacobson et al. |
| 2016/0103801 A1 | 4/2016 | Bortz et al. |
| 2016/0117072 A1 | 4/2016 | Sharifi et al. |
| 2016/0306777 A1 | 10/2016 | George et al. |
| 2016/0371495 A1 | 12/2016 | Bhat et al. |
| 2017/0031825 A1 | 2/2017 | Chen et al. |
| 2017/0031831 A1 | 2/2017 | Bohra et al. |
| 2017/0039281 A1 | 2/2017 | Venkata et al. |
| 2017/0041296 A1 | 2/2017 | Ford et al. |
| 2017/0118308 A1 | 4/2017 | Vigeant et al. |
| 2017/0160895 A1 | 6/2017 | Hu et al. |
| 2017/0237868 A1 | 8/2017 | Sato |
| 2017/0242934 A1* | 8/2017 | Bullotta ............. G06Q 10/0631 |
| 2017/0308271 A1 | 10/2017 | Li |
| 2017/0351708 A1 | 12/2017 | Lahmann et al. |
| 2017/0357437 A1 | 12/2017 | Peterson et al. |
| 2018/0069947 A1 | 3/2018 | Antipa et al. |
| 2018/0121468 A1 | 5/2018 | Setlur et al. |
| 2018/0150899 A1 | 5/2018 | Waldron et al. |
| 2018/0335911 A1 | 11/2018 | Nilo et al. |
| 2018/0335912 A1 | 11/2018 | Nilo et al. |

OTHER PUBLICATIONS

Google Now, available online at https://en.wikipedia.org/wiki/Google_Now, Oct. 29, 2015, 6 pages, retrieved on Jan. 10, 2017.

Microsoft Power BI (Business intelligence), available online at https://en.wikipedia.org/wiki/Power_BI, 2 pages, updated on Aug. 29, 2016; retrieved on Sep. 22, 2016.

Power BI—basic concepts, Microsoft Power BI, available online at https://powerbi.microsoft.com/en-us/documentation/powerbi-service-basic-concepts/, 2015, 11 pages, retrieved on Mar. 10, 2016.

Power BI Support, Q&A in Power BI, available online at https://powerbi.microsoft.com/en-us/documentation/powerbi-service-q-and-a/, 2015, 4 pages, retrieved on Mar. 10, 2016.

Search-Driven Analytics for Humans-Now anyone can be their own data analyst, Thought Spot, available online at www.thoughtspot.com, 4 pages, retrieved on Mar. 10, 2016.

Novet, Birst lets you search enterprise data like you search Google, VentureBeat, available online at http://venturebeat.com/2013/12/10/birst-boosts-business-intelligence-with-google-like-search-to-visualize-data/, Dec. 10, 2013, 3 pages, retrieved on Mar. 10, 2016.

U.S. Appl. No. 15/273,567, filed Sep. 12, 2016, 81 pages.

U.S. Appl. No. 15/273,567, Non-Final Office Action dated Sep. 14, 2018, 23 pages.

U.S. Appl. No. 15/297,037, Non-Final Office Action dated Sep. 21, 2018, 9 pages.

U.S. Appl. No. 15/297,037, "Notice of Allowance", dated Mar. 4, 2019, 8 pages.

U.S. Appl. No. 15/273,567, Non-Final Office Action dated Jan. 17, 2019, 25 pages.

U.S. Appl. No. 15/273,567, Notice of Allowance dated Aug. 21, 2019, 16 pages.

\* cited by examiner
† cited by third party

SEMANTIC SEARCHES IN A BUSINESS INTELLIGENCE SYSTEM

CROSS REFERENCE TO RELATED APPLICATION

This application claims priority to and the benefit of U.S. Provisional Application No. 62/055,402, filed Sep. 25, 2014, which is incorporated herein in its entirety.

BACKGROUND

Business intelligence systems typically use large, very complex data stores in the form of databases and data warehouses, as examples. These stores are accessible by sophisticated trained users that can produce the requested information by using complex query structures and reports in the vernacular of the databases.

Typical users do not have this level of sophistication and training to access this information. These users area comfortable with 'textual searching' such as that used in Google® and other search engines. Current systems do not have the capability to provide the user with this type of access, nor do they produce the responses in a format that the user can understand.

Further, with the advent of mobile devices, such as smart phones and tablets, user have become accustomed to accessing data and getting answers wherever they are located. They want to input textual questions, even into complex, large, databases and data warehouses, and receive the answers in an easily understandable format.

DETAILED DESCRIPTION OF THE EMBODIMENTS

Figure 1:
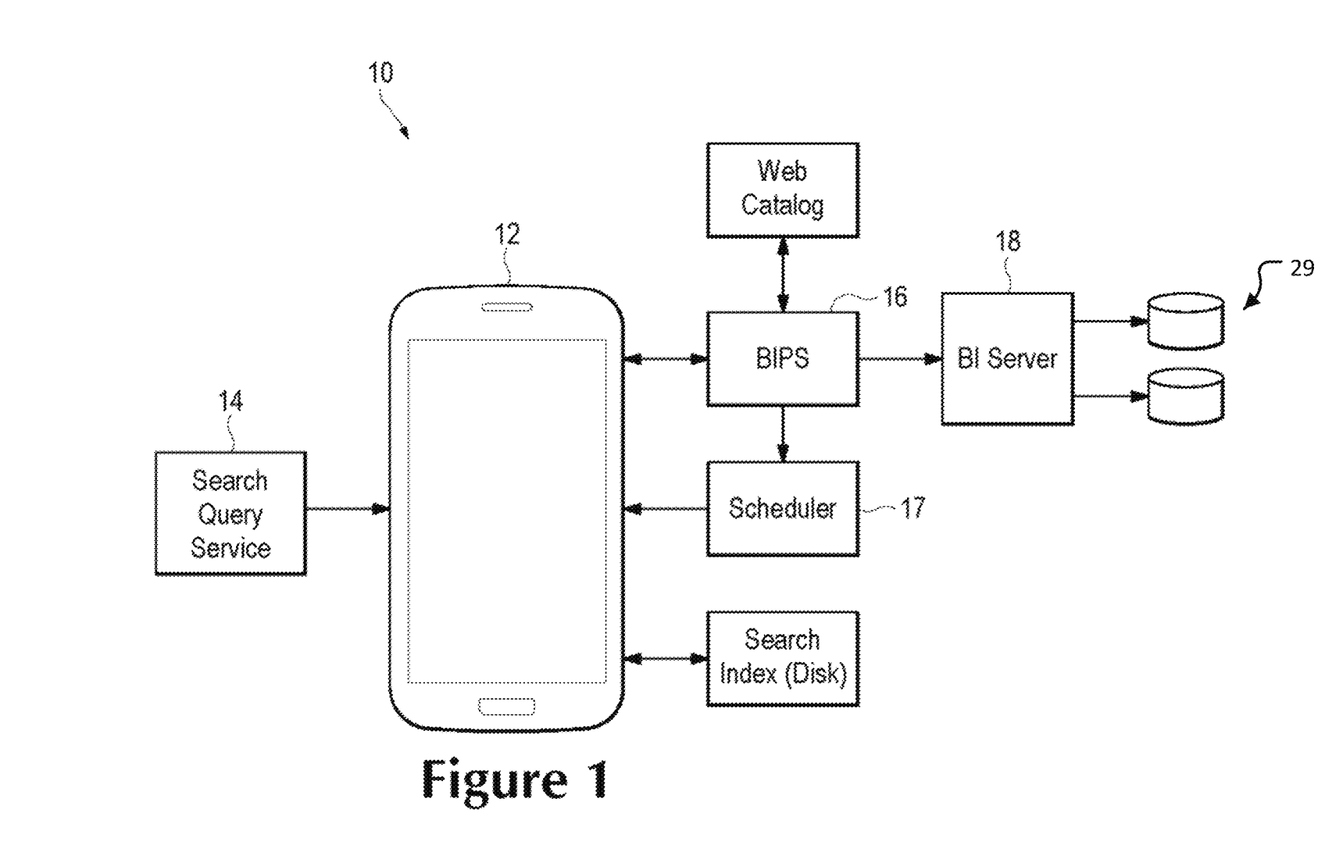
FIG. 1 shows an overall system architecture for a business intelligence search program.

FIG. 1 shows an overall system diagram for a business intelligence search engine 10. FIG. 1 includes a user device, which may be referred to as a client 12, upon which is running a search query service 14. In one embodiment, the query search service 14 is a Java® service running in a J2EE environment. The search is provided to a business intelligence presentation service (BIPS 16), also referred to as the presentation layer, and a scheduler 17 that may schedule and manage the data indexing. The data indexing may take the form of data crawls through the data structure and multiple crawls may be occurring at once. The business intelligence (BI) server 18 then accesses the various data stores 29 available, which may include databases, data warehouses, etc.

The search system allows a user that does not have a background in databases and data warehouses to perform a textual search of the data to get an answer to a simple query. The answer may take the form of a graphical representation of the answer, allowing the user to visualize the answer.

The search system has several components that operate to take the user's request and produce an answer in a form the user can quickly understand. Through a user interface, the user can enter a query into the business intelligence system (BI) in the form of a 'regular' question. Examples include queries like, "What is the revenue of iPods for the North East in 2011?" or "Compare 2011 Q1 revenue to 2012 Q3."

Figure 2:
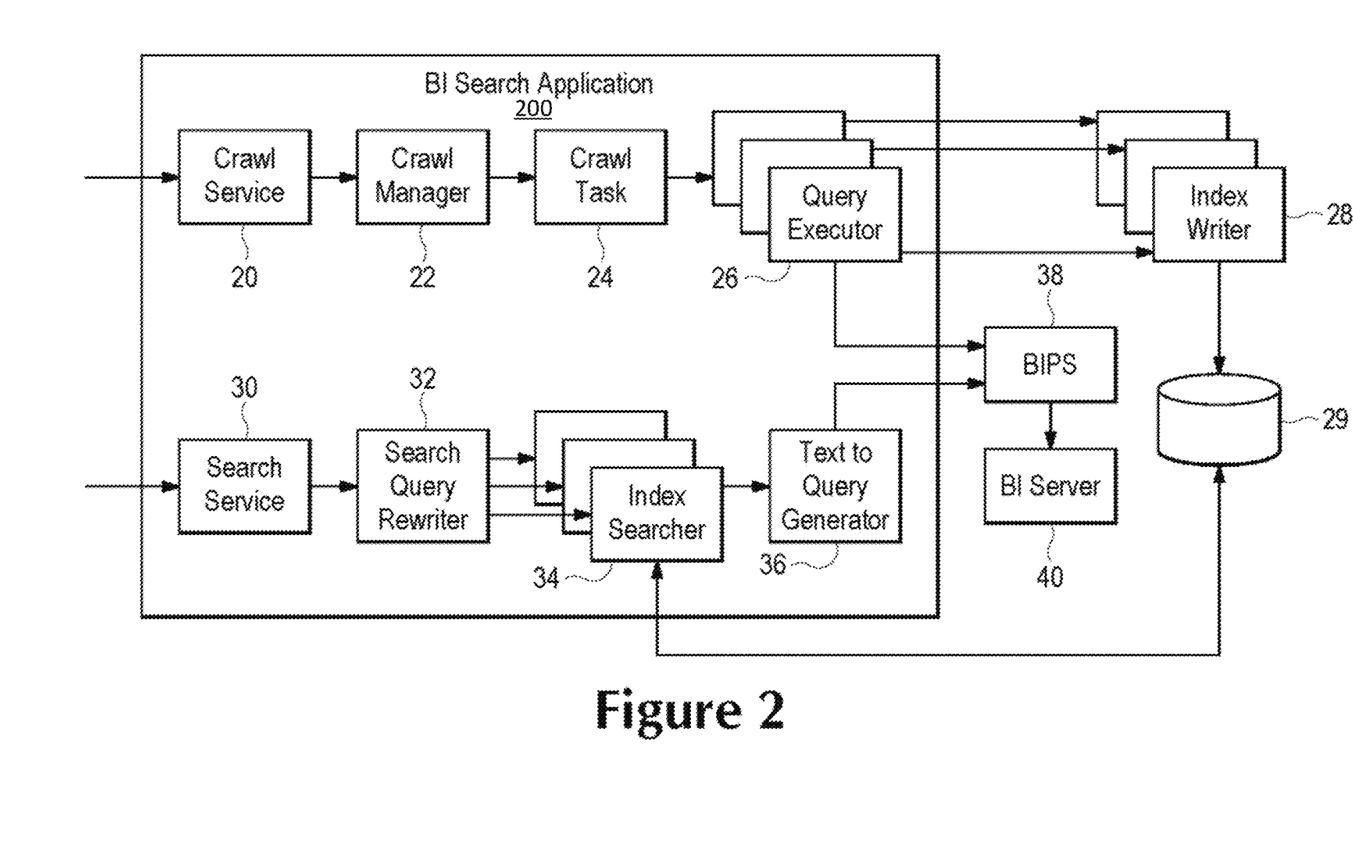
FIG. 2 shows a diagram of a search system usable in a business intelligence program.

FIG. 2 illustrates a business intelligence (BI) search application 200. The search service 30 launches a search query rewriter 32 to generate a query in terms that the data index storage repository 29 can 'understand.' These are then queried by the index searcher 34. For example, the questions above may be rewritten to queries in a query language such as SQL (Structured Query Language) corresponding to "Revenue iPods North East 2011" and "Revenue 2011 Q1 vs Revenue 2012 Q3." These are then used by the index searcher 34 to access the disk 29. A text to query generator 36 takes the indexed searches and generates a query for which the visualization, such as a bar chart or other graph, is generated. The queries and their visualizations are then sent to the presentation server (BIPS 38) and the BI server 400 to generate SQL Queries.

The Crawl Service 20 may launch according to a schedule. As mentioned before, the Crawl Service 20 and the Query service may be Java® services running in a J2EE environment. The crawl service 20 invokes a crawl manager 22 that manages the various crawls that may be running at the same time. The crawl manager 22 may, for example, limit the number of crawls operating simultaneously to one, and set up a queue for the other crawl requests.

The crawl manager 22 launches a crawl task 24. The crawl task 24 may be initiated through the BI Search Semantic Indexing Scheduler, an automated process that performs the crawl. The progress of a crawl, such as the statistics of number of areas indexed, number of subject area columns indexed, total number data values indexed, etc., may be stored in the business intelligence log files as informational entries. The areas indexed may include metadata, such as measures, dimensions and data members and attributes. Once a crawl has been completed, the admin user may be notified using the delivery of a message, success or failure. Further, the system may provide monitoring of the crawl. The crawling user may receive an email indicating that the crawl has begun, with the option of a link to allow the user to stop the crawl. When the crawl completes, another email may notify the user of its completion.

The crawl task 24 in turn then launches query executors 26 that convert the queries into SQL, or other language, queries that will execute on the data gathered by the crawl task 24. In order to make use of that data later, the query executors 26 start index writers 28 to index the queries and write them to some sort of storage repository 29. The query executors 26 also send the queries to the presentation server (e.g., the BIPS 38), which in turn sends the queries to the business intelligence server 40. The indexes of the queries will be where the user's search will operate.

When the user enters the desired search, the search process converts it to queries and accesses the index of the semantic layer (rpd file) to provide the answers. As discussed above, the search system allows the user to input 'textual searches' in the form most users are familiar and returns a graph that allows a user to understand the answer easily. When the users launches the search interface on the user's device, typically a smart phone or other mobile device, that starts the search service 30. The user then inputs a search term or terms, which can be of varying levels of complexity.

FIGS. 3-10 show examples of these interfaces 50 and help in explaining some assumptions that are made by the system to provide the user with information and options. For example in FIG. 3, the user has selected one search term, 'revenue.' Referring back to FIG. 2, the search service 30 receives the user input for revenue and passes it to the search query rewriter 32, which then takes the term and rewrites it into a query language form, such as SQL. The rewritten query is then used by the index searchers 34 to locate the revenue information located in the data repository 29 and retrieves that information for the text-to-query generator 36. The text-to-query generator 36 converts the results of the search into some sort of user-friendly format, referred to here as a visualization, to be presented by the presentation server (e.g., the BIPS 38). The search and its resultant metadata, which may include the SQL statements, the results from the index searchers 34, and the visualization, may then be stored in the BI server 40.

As the user navigates the search and results, the system gathers statistics to find the most relevant content for a given query. This information will be used to make the next execution of that query work faster and produce more relevant results. Similarly, the system 'learns' common analysis and visualization patterns. This will become clearer as the discussion goes through the user interfaces.

Figure 3:
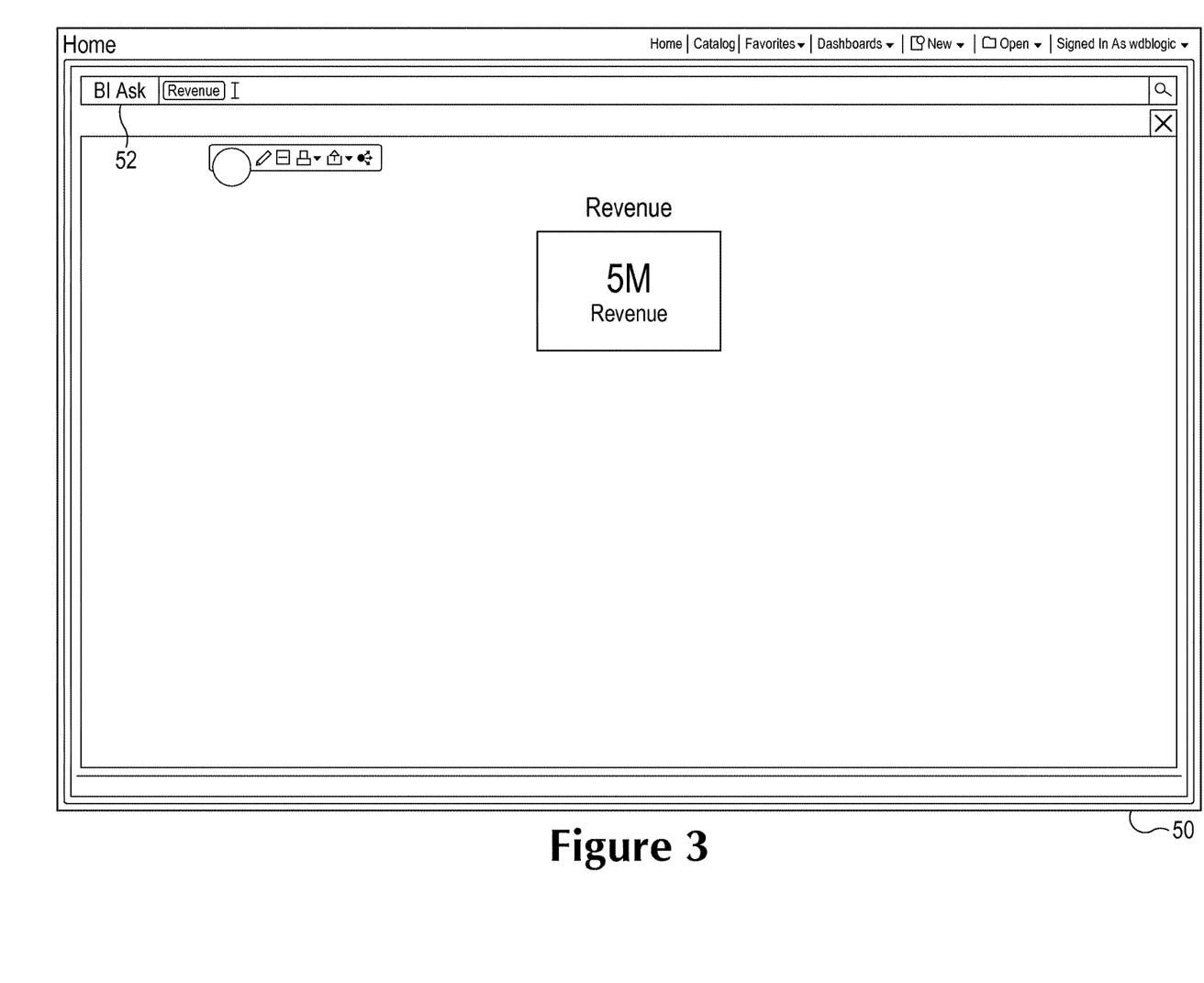
FIGS. 3-10 show examples of user interfaces for textual searching.

In FIG. 3, the user wants to know the total revenue, so just types in "Revenue" at the search bar 52 and the system returns the response shown, revenue of $5 million. At any point in the process, the user may have the ability to save the 'report' or the visualization and the data upon which is relies. That saving of information may also include the metadata above. As mentioned above, the system has the ability to 'learn' or make itself more efficient. One way the system may learn is to store the report and its parameters. When the user logs in again, the system could offer that report for the user's review, or could offer to update the information in the report. This gives the system a head start on generating a new report. As the user continues to use the system, the number of previously-accomplished searches and results will be available for the system to use.

In one embodiment, the system learns based on several different aspects of interactions with the user. These include, but are not limited to: frequently used terms in the search by a user; frequently used visualization by the user, based on the number of metrics and breakdowns (dimensions); frequently used data values, such as product: iPod, iPad etc., frequently queried metrics; time of the day, week and month a user is searching for certain information (for example, during the close of the quarter what metrics do people in the finance department query); and location where the user queries the data if enabled in a mobile device. The system builds a graph of different nodes, such as User, Terms, Metrics, Time of Day and Location. It then uses a combination of graph traversal algorithms in which all of the nodes are visited in a set sequence, updating and/or checking their data during the sequence, text clustering algorithms in which text is clustered using descriptors and descriptor extraction, and Naïve Bayesian algorithms in which probabilistic classifiers based upon Bayes' theorem with strong, or naïve, independence assumptions between the features, to learn the user preferences and also relative relevancy of matches.

Figure 4:
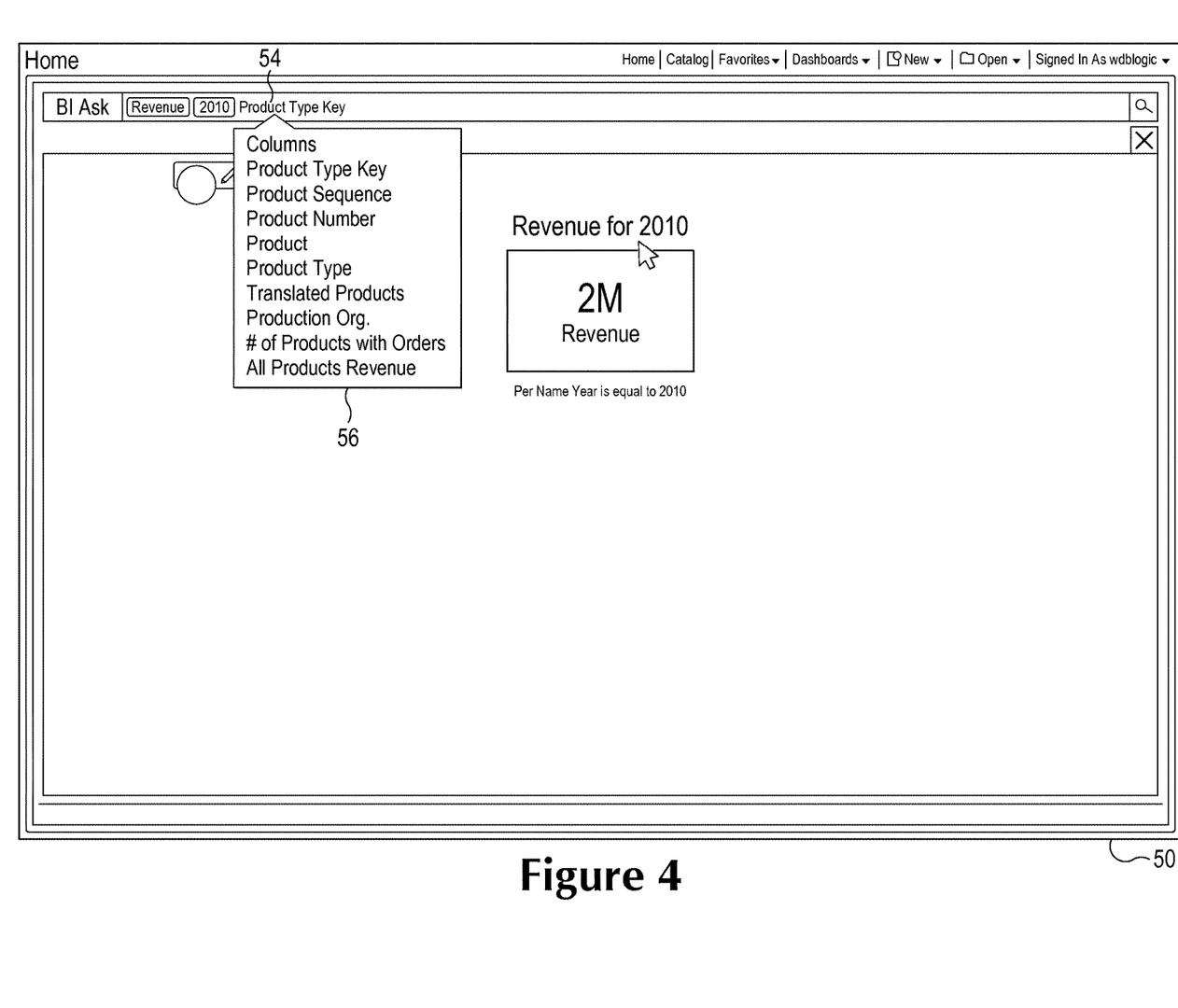

Referring back to FIG. 3, the user only chose one search term, 'revenue.' The user may be given the ability to make this more definite, by clicking next to the already-selected term in the search bar. In FIG. 4, the user adds 2010 as an added parameter, and the response shows revenue for $2 million. In addition in FIG. 4, one can see a drop down list 56 of suggested other parameters. As mentioned above, the search process may document and save the search terms and their associated queries for future use. In one embodiment, they are stored by user, so the system can access a list of terms used by the user and the statistics of the most frequently used terms 54. Accessing this list would allow the system to populate the drop down list 56.

Figure 5:
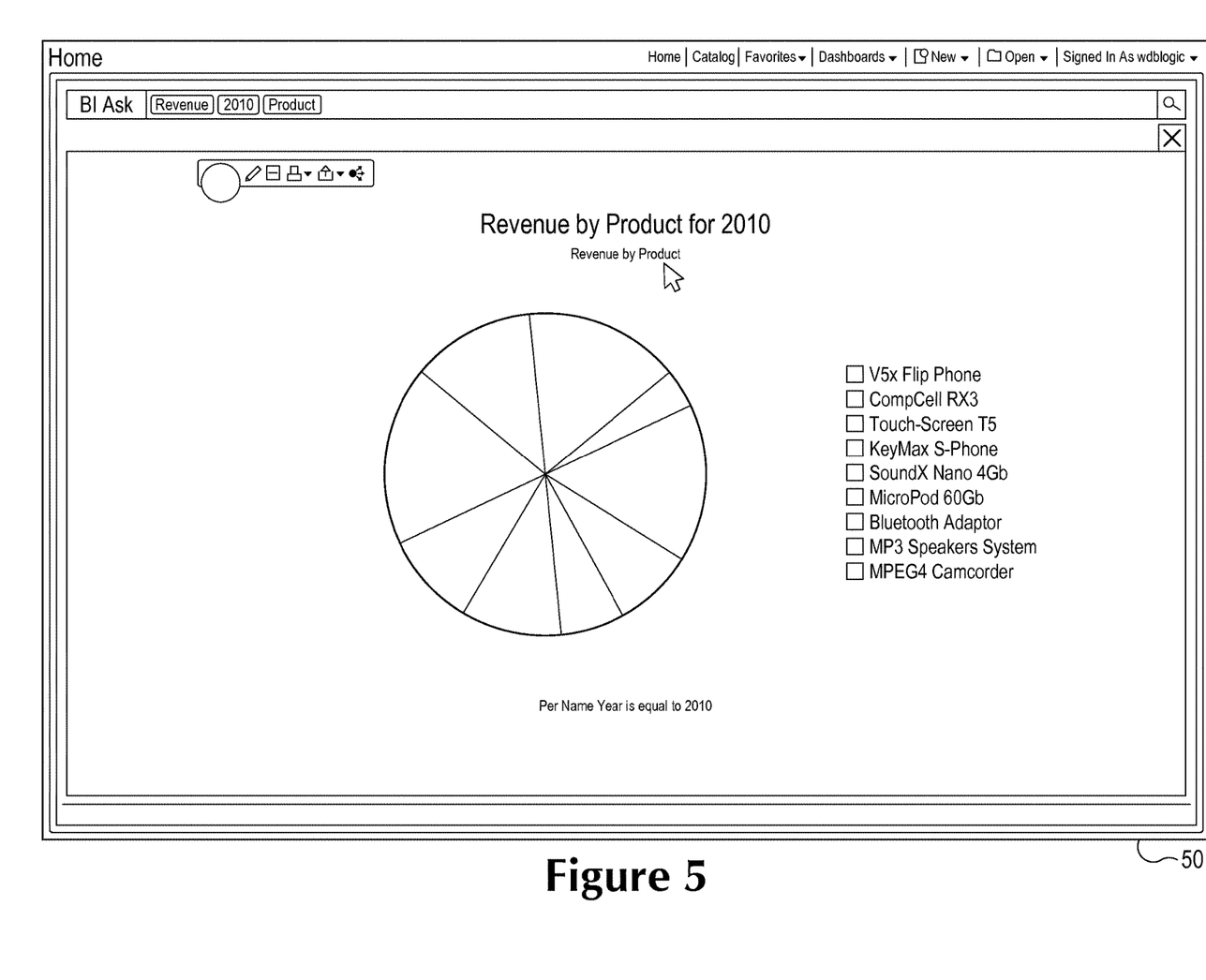

In FIG. 5, the user has added in the parameter of revenue by product. The system automatically generates a new view, in this case a pie chart. The added terms may be typed in by the user or may be accessed by a pulldown list 56 as shown in FIG. 4. These options also include the user typing in the questions discussed above, like "Compare 2011 Q1 revenue to 2012 Q3."

As the system presents visualizations such as the pie chart in FIG. 5, it can also offer other formats for the user. In some cases, the user may type in the terms 'pie chart' or 'bar graph' in the search bar. The system would then present the appropriate visualization. The system can use this as another opportunity to learn about the user and gather statistics as to what types of visualizations the user prefers. This particular user may prefer pie charts, so the system may default to presenting information to the user in pie charts. The level of complexity of the information is left up to the system designer as to how much information about the user the system should use and to what level of granularity.

Figure 6:
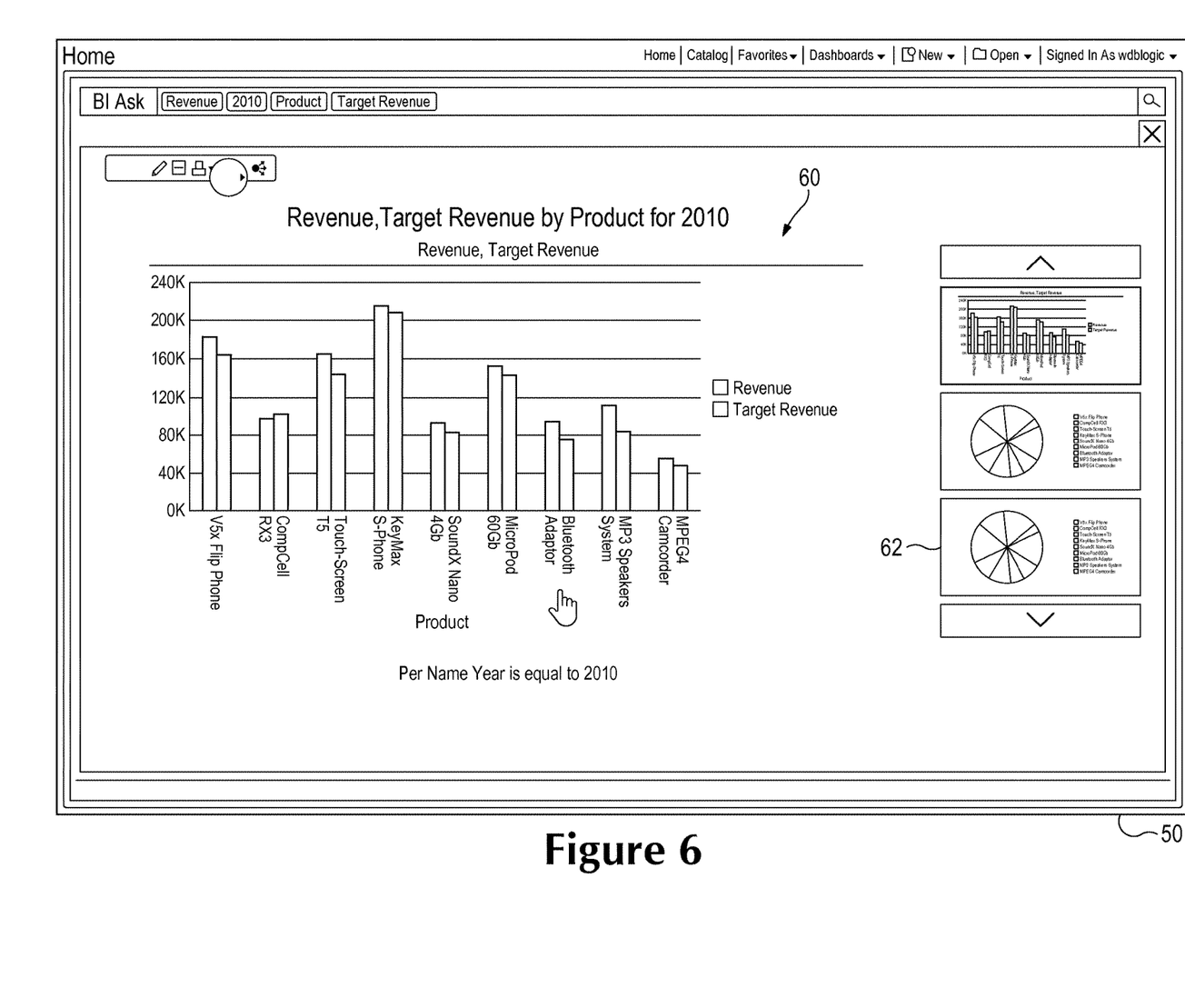

For example, in FIG. 6, the additional element of 'target revenue' is added. There are now four elements to the user's search, each of which will have its own query statements, results and conversion to visualization. The user may have different visualization depending upon the number of elements of the search, or the nature of the search. He or she may prefer comparative bar charts 60 as shown in FIG. 6 when there is a 'target' or 'projected' or the term 'versus' in the original search request. The system gathers all of this information and accesses it when the user logs in and performs a search. The text-to-query generator 36 can retrieve it from the BI server 40 and use it to generate the visualizations. Also shown in FIG. 6 is a side bar 62 that displays other visualization options to the user. If the user starts selecting one of the other charts more frequently, the system will gather this statistic as well and use it to learn the user's preferences.

Figure 7:
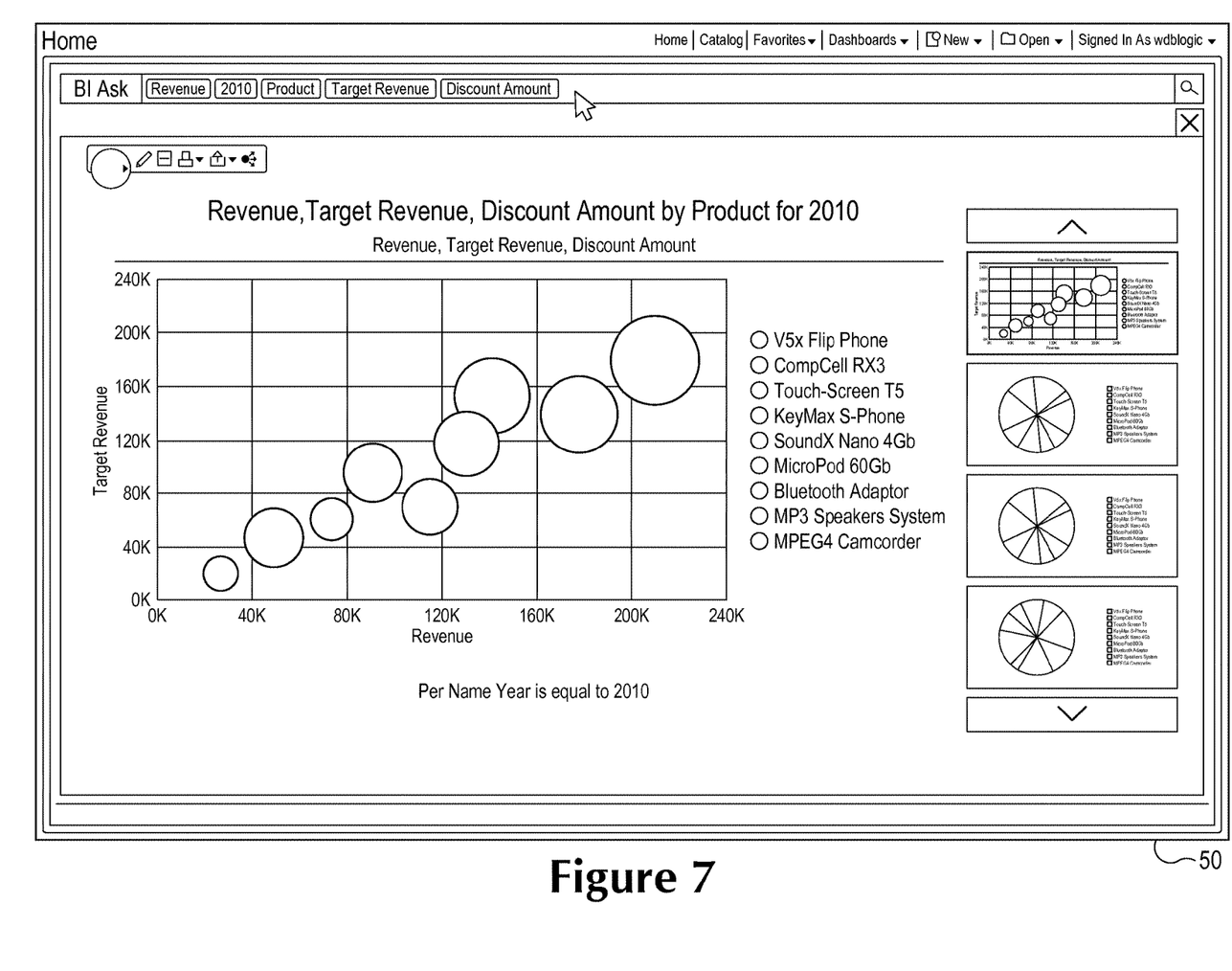
Figure 8:
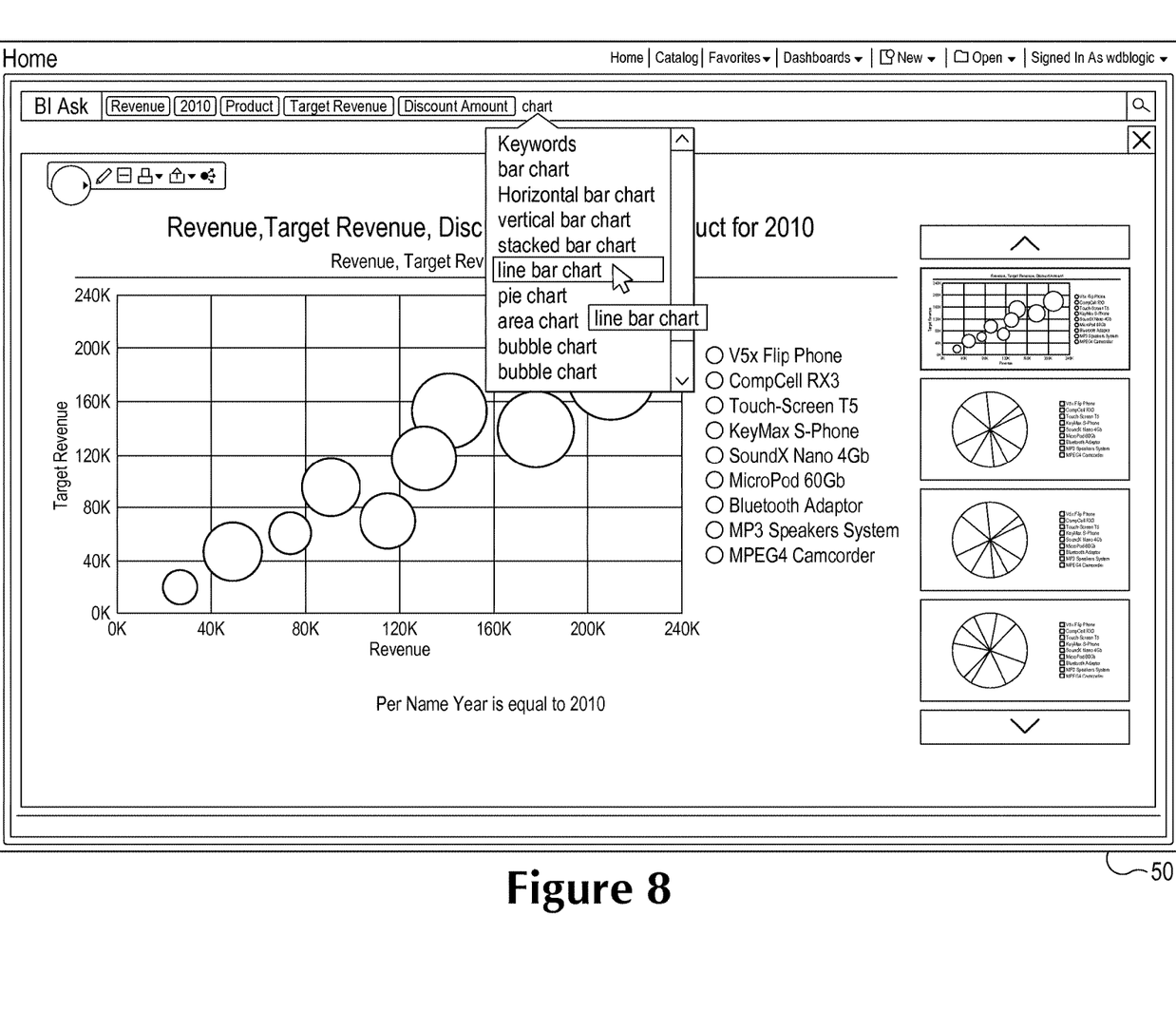

FIG. 7 shows an alternative view for presentation to the user. One should note that the sidebar only shows this type of chart and pie charts as options. This may be based upon the user's preferences as noted above, or may be based upon the level of complexity of the query. However, this does not limit the user to those particular types. Under the term 'chart' in the search bar, as shown in FIG. 8, the pull down list allows the user to select one of many different charts. As the user uses the system and this information is gathered, the system will start to be more accurate in matching the offered visualizations with the user's preference, making the system more efficient and user friendly.

Figure 9:
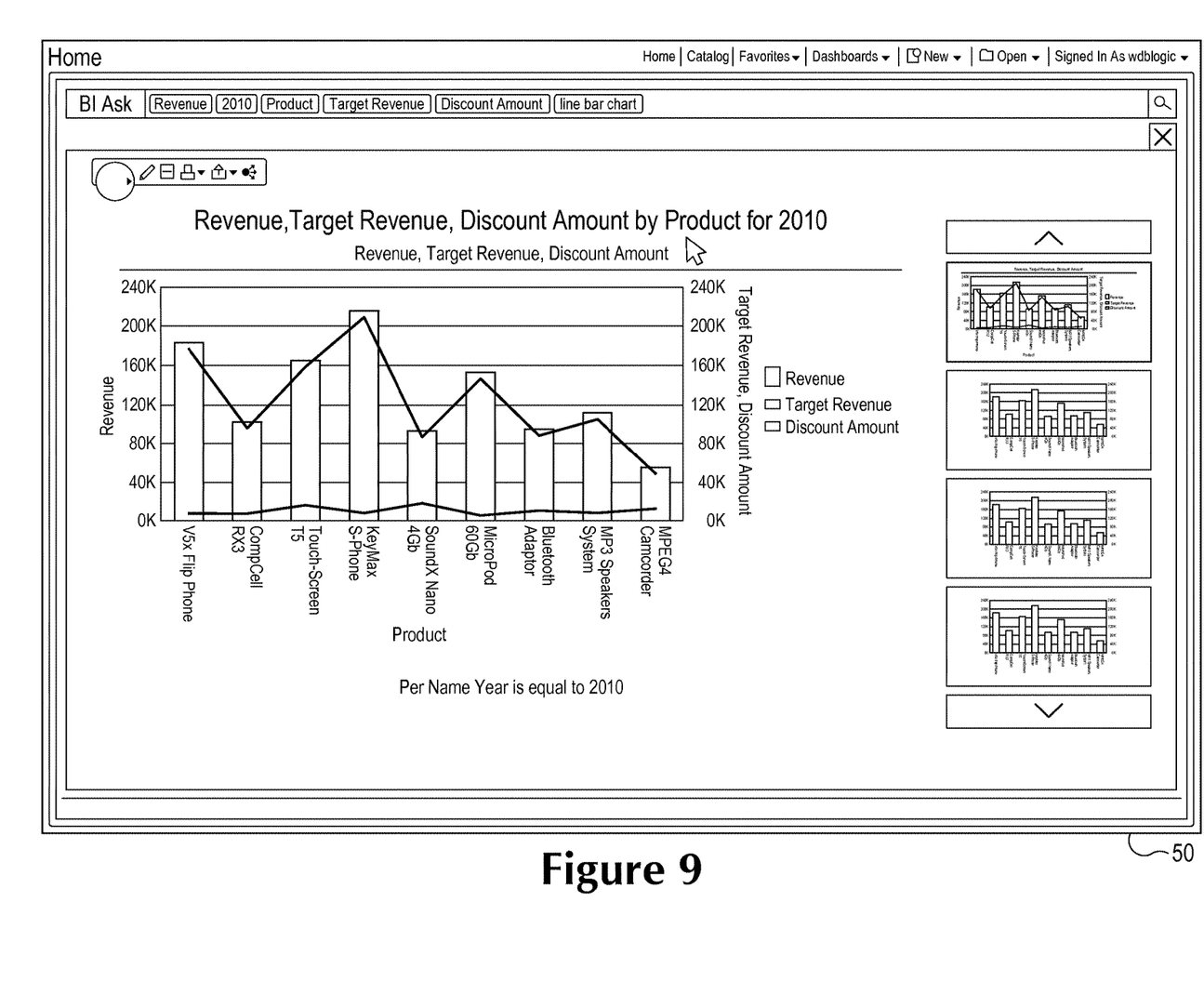
Figure 10:
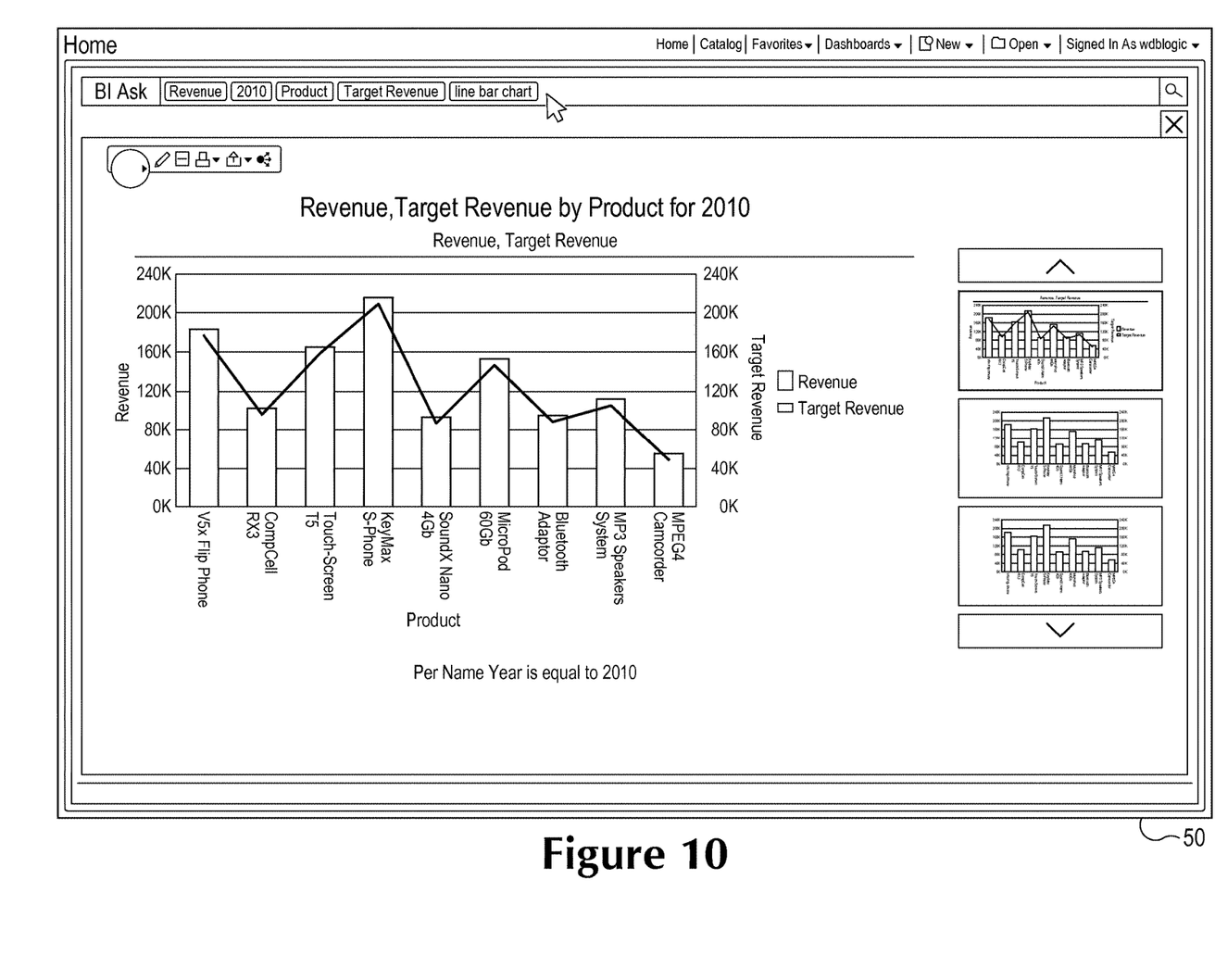

FIG. 9 shows the resulting line bar chart, with other line bar charts offered to the right. If the user decides that he or she does not want to see the discount amount that is included with the chart, highlighted in FIG. 9, the user can remove it. Each of the search terms in the search bar will have their own pull down list to allow the user to change or delete that term. In FIG. 10 shows an example in which the user as removed the discount amount term from the search bar. The removal of a term is not necessarily depending upon the other terms in the search bar.

One should note that the above user interfaces 50 were shown in 'desktop' form, but will have mobile versions as well. Using this system, a relatively unsophisticated user can access the wealth of data stored in their organizations business intelligence system. The system can gather statistics on the user's interaction with the system to allow it to offer suggestions as to search terms, visualizations, reports, etc. The storage of the resulting searches and visualizations will also allow the system to have access to already formatted query statements and other information to make it run more efficiently.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the embodiments here.

What is claimed is:

1. A computer-implemented method, comprising:
   causing a graphical user interface to be displayed on a device, wherein the graphical user interface is generated by a search application executing on the device, and wherein the graphical user interface includes a search bar operable to accept user input;
   receiving a first search term entered using the search bar;
   displaying the first search term in the search bar;
   generating a query using the first search term, wherein the query is generated by rewriting the first search term to a query language form;
   executing, using the query, a search of one or more data stores by an index searcher;
   determining a first visualization for presenting a first result obtained from searching the one or more data stores, wherein the first visualization is determined based on a number of search terms in the search bar and the first result, wherein the first visualization includes a chart of a first type;
   displaying the first visualization in the graphical user interface;
   receiving an indication of a selection of the first search term within the search bar;
   in response to receiving the indication of the selection, displaying a drop down list within the graphical user interface, the drop down list including one or more suggested search parameters based on the first search term and a statistic indicating most frequently used search terms;
   receiving a second search term due to selection of a suggested parameter from the one or more suggested search parameters in the drop down list;
   displaying the second search term in the search bar, wherein the second search term is displayed simultaneously with the first search term;
   determining, in response to receiving the second search term, a second result, wherein the second result is based on a number of search terms in the search bar and the second search term;
   determining, in response to determining the second result, a second visualization for presenting the second result, wherein the second visualization includes a chart of a second type, wherein the second type is different from the first type; and
   replacing, in response to determining the second visualization, the first visualization with the second visualization
   adding the first search term, the second search term, and other inputs determined through the graphical user interface to a set of user preferences, wherein the set of user preferences are associated with a particular user, and where the set of user preferences is used to search the one or more data stores or to determine the first visualization or the second visualization; and
   generating a graph, wherein nodes in the graph are associated with the set of user preferences, and wherein the graph is traversed to determine a user preference.

2. The computer-implemented method of claim 1, wherein the first search term is determined from a text string input into the search bar.

3. The computer-implemented method of claim 1, wherein the one or more suggested search terms are determined based on past searches.

4. The computer-implemented method of claim 1, wherein the second visualization is based on a number of search terms simultaneously displayed in the search bar.

5. The computer-implemented method of claim 1, wherein the first visualization is further based on a stored user preference.

6. The computer-implemented method of claim 1, further comprising:
   generating one or more additional visualizations, wherein the one or more additional visualizations are based on the first search term, the first result, the second search term, and the second result; and
   displaying, simultaneously with the second visualization, the one or more additional visualizations in a side bar in the graphical user interface, wherein at least one visualization of the one or more additional visualizations includes a chart of a third type, wherein the third type is different from the second type.

7. The computer-implemented method of claim 1, wherein determining the second result comprises:
   generating a second query for the second search term; and
   executing, using the second query, a second search of the one or more data stores, where the second visualization is further based on additional data included with a result of the second search.

8. The computer-implemented method of claim 1, further comprising:
   adding the first search term and the second search term to a statistical model associated with the particular user, wherein the statistical model is used to determine content relevant to the particular user.

9. The computer-implemented method of claim 1, wherein the set of user preferences include statistics determined from search terms.

10. The computer-implemented method of claim 1, wherein the set of user preferences include information derived from the device when the first search term or the second search term is selected.

11. The computer-implemented method of claim 1, wherein the device is a mobile device.

12. A system, comprising:
   a search system comprising one or more servers; and
   a data store storing data indexes;
   wherein the search system is configured to:
      cause a graphical user interface to be displayed on a device, wherein the graphical user interface includes a search bar operable to accept user input;
      receive a first search term entered using the search bar;
      generate a query using the first search term, wherein the query is generated by rewriting the first search term to a query language form;
      execute, using the query, a search of one or more data stores by an index searcher;
      determine a first visualization for presenting a first result obtained from searching the one or more data stores, wherein the first visualization is determined based on a number of search terms in the search bar, context associated with the first search term, and with the first result, wherein the first visualization includes a chart of a first type;

display the first visualization in the graphical user interface;

receive an indication of a selection of the first search term within the search bar;

in response to receiving the indication of the selection, display a drop down list within the graphical user interface, the drop down list including one or more suggested search parameters based on the first search term and a statistic indicating most frequently used search terms;

receive a second search term due to selection of a suggested parameter from the one or more suggested search parameters in the drop down list wherein the second search term is present in the search bar, simultaneous with the first search term, and wherein the second search term is entered after the first visualization is displayed;

determine, in response to receiving the second search term, a second result, wherein the second result is based on a number of search terms in the search bar and context associated with the second search term;

determine, in response to determining the second result, a second visualization for presenting the second result, wherein the second visualization includes a chart of a second type, wherein the second type is different from the first type; and replace, in response to determining the second visualization, the first visualization with the second visualization add the first search term, the second search term, and other inputs determined through the graphical user interface to a set of user preferences, wherein the set of user preferences are associated with a particular user, and where the set of user preferences is used to search the one or more data stores or to determine the first visualization or the second visualization; and generate a graph, wherein nodes in the graph are associated with the set of user preferences, and wherein the graph is traversed to determine a user preference.

13. The computer-implemented method of claim 1, further comprising:

determining the chart of the first type, based at least in part on a key term within the search bar, wherein the key term includes at least one of the following terms:

versus;

target; or projected.

14. The system according to claim 12, wherein the search system is further configured to:

generate a second query for the second search term; and execute, using the second query, a second search of the one or more data stores, where the second visualization is further based on additional data included with a result of the second search.

15. The system of claim 14, wherein the first search term is determined from a text string input into the search bar.

16. The system of claim 12, wherein the one or more suggested search terms are determined based on past searches.

17. The system of claim 14, wherein the second visualization is based on a number of search terms simultaneously displayed in the search bar.

18. The system of claim 14, wherein the search system is further configured to:

generate one or more additional visualizations, wherein the one or more additional visualizations are based on the first search term, the first result, the second search term, and the second result; and display, simultaneously with the second visualization, the one or more additional visualizations in a side bar in the graphical user interface, wherein at least one visualization of the one or more additional visualizations includes a chart of a third type, wherein the third type is different from the second type.

* * * * *

UNITED STATES PATENT AND TRADEMARK OFFICE
CERTIFICATE OF CORRECTION

PATENT NO. : 10,664,488 B2
APPLICATION NO. : 14/861893
DATED : May 26, 2020
INVENTOR(S) : Ananth Venkata et al.

Page 1 of 1

It is certified that error appears in the above-identified patent and that said Letters Patent is hereby corrected as shown below:

On the Title Page

On page 2, Column 1, under U.S. Patent Documents, Line 54, delete "4/2014" and insert -- 2/2014 --, therefor.

In the Claims

In Column 8, Line 20, in Claim 15, delete "claim 14," and insert -- claim 12, --, therefor.

In Column 8, Line 25, in Claim 17, delete "claim 14," and insert -- claim 12, --, therefor.

In Column 8, Line 28, in Claim 18, delete "claim 14," and insert -- claim 12, --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*